US012779412B2

(12) United States Patent
Sugimoto et al.

(10) Patent No.: US 12,779,412 B2
(45) Date of Patent: Nov. 3, 2026

(54) ELECTRICITY STORAGE DEVICE ELECTRODE SLURRY MANUFACTURING APPARATUS AND METHOD OF MANUFACTURING ELECTRICITY STORAGE DEVICE ELECTRODE SLURRY

(71) Applicants: Prime Planet Energy & Solutions, Inc., Tokyo (JP); JTEKT CORPORATION, Aichi-ken (JP)

(72) Inventors: Kenya Sugimoto, Himeji (JP); Keisuke Yoshikawa, Anjo (JP)

(73) Assignees: PRIME PLANET ENERGY & SOLUTIONS, INC., Tokyo (JP); JTEKT CORPORATION, Aichen-Ken (JP)

( * ) Notice: Subject to any disclaimer, the term of this patent is extended or adjusted under 35 U.S.C. 154(b) by 0 days.

(21) Appl. No.: 19/073,007

(22) Filed: Mar. 7, 2025

(65) Prior Publication Data

US 2025/0288964 A1 Sep. 18, 2025

(51) Int. Cl.
*B01F 27/722* (2022.01)
*B01F 27/724* (2022.01)
*H01M 4/04* (2006.01)

(52) U.S. Cl.
CPC ........ *B01F 27/7221* (2022.01); *B01F 27/724* (2022.01); *H01M 4/0411* (2013.01); *H01M 4/0435* (2013.01)

(58) Field of Classification Search
CPC .. B01F 27/7221; B01F 27/724; B01F 27/722; B01F 27/72; B01F 27/921; H01M 4/04; H01M 4/0411
See application file for complete search history.

(56) References Cited

U.S. PATENT DOCUMENTS

2017/0062797 A1* 3/2017 Sugihara ............. H01M 4/0404
2018/0160718 A1* 6/2018 Liet ..................... B01F 35/2205
2024/0290939 A1 8/2024 Sato et al.

FOREIGN PATENT DOCUMENTS

JP 2000-309012 A 11/2000
JP 2011-233380 A 11/2011
JP 3236177 U * 2/2022
JP 2024-120452 A 9/2024
WO WO-2023190939 A1 * 10/2023 .............. H01M 4/04

OTHER PUBLICATIONS

Translation of WO-2023190939-A1 (Year: 2023).*
Translation of JP-3236177-U (Year: 2022).*

* cited by examiner

*Primary Examiner* — Jason K Niesz
(74) *Attorney, Agent, or Firm* — HAUPTMAN HAM, LLP

(57) ABSTRACT

An electrode slurry manufacturing apparatus includes a material loading unit, a feeder unit, and a multi-screw kneader. The material loading unit puts a plurality of types of electrode materials collectively into the feeder unit. The feeder unit includes an inlet opening, an agitation chamber, a discharge opening, a feeding blade, and a spiral shaped blade. Into the inlet opening, the electrode materials are loaded from the material loading unit. The electrode materials are agitated in the agitation chamber. The discharge opening is disposed in a bottom part of the agitation chamber. The feeding blade is mounted to a shaft disposed on the bottom part of the agitation chamber. The feeding blade feeds the electrode materials to the discharge opening. The spiral shaped blade is disposed above the feeding blade and is mounted to the shaft.

5 Claims, 7 Drawing Sheets

ELECTRICITY STORAGE DEVICE ELECTRODE SLURRY MANUFACTURING APPARATUS AND METHOD OF MANUFACTURING ELECTRICITY STORAGE DEVICE ELECTRODE SLURRY

CROSS REFERENCE TO RELATED APPLICATIONS

The present application claims priority from Japanese Patent Application No. 2024-039527 filed on Mar. 14, 2024, which is incorporated by reference herein in its entirety.

BACKGROUND

The present disclosure relates to an electricity storage device electrode slurry manufacturing apparatus and a method of manufacturing an electricity storage device electrode slurry.

JP 2011-233380 A discloses a continuous manufacturing apparatus for manufacturing a secondary battery electrode slurry, which continuously manufactures the electrode slurry. The continuous manufacturing apparatus includes a feeding section, a mechanochemical processing section, a first kneading and dispersing treatment section, and a second dispersing treatment section. The feeding section supplies a powdery battery material containing at least a powdery electrode active material. The mechanochemical processing section performs a mechanochemical process on the powdery battery material. The first kneading and dispersing treatment section performs a kneading and dispersing treatment on a liquid-state binder and a mechanochemically processed material. The second kneading and dispersing treatment section dilutes the kneaded material treated by the first kneading and dispersing treatment section with a diluent. It is stated that such a continuous manufacturing apparatus is able to continuously manufacture the electrode slurry with good reproducibility.

SUMMARY

The present inventors intend to improve the product quality of the electrode slurry that is manufactured using a plurality of types of electrode materials.

According to the present disclosure, an electrode slurry manufacturing apparatus includes a material loading unit, a feeder unit, and a multi-screw kneader. The material loading unit is configured to put a plurality of types of electrode materials collectively into the feeder unit. The feeder unit includes an inlet opening, an agitation chamber, a discharge opening, a feeding blade, and a spiral shaped blade. Into the inlet opening, the electrode materials are loaded from the material loading unit. The electrode materials are agitated in the agitation chamber. The discharge opening is disposed in a bottom part of the agitation chamber. From the discharge opening, the electrode materials are fed out to the multi-screw kneader. The feeding blade is mounted to a shaft disposed on the bottom part of the agitation chamber. The feeding blade feeds the electrode materials to the discharge opening. The spiral shaped blade is disposed above the feeding blade and is mounted to the shaft. The electrode slurry manufacturing apparatus as described above is able to improve the product quality of the electrode slurry that is manufactured using a plurality of types of electrode materials.

DETAILED DESCRIPTION

Hereinbelow, embodiments of the technology according to the present disclosure will be described with reference to the drawings. It should be noted, however, that the disclosed embodiments are, of course, not intended to limit the disclosure. The drawings are depicted schematically and do not necessarily accurately depict actual objects. The features and components that exhibit the same effects are designated by the same reference symbols as appropriate, and the description thereof will not be repeated as appropriate.

Method of Manufacturing Battery

Figure 1:
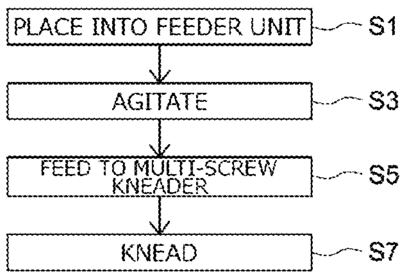
FIG. 1 is a flowchart illustrating a method of manufacturing an electrode slurry.

FIG. 1 is a flowchart illustrating a method of manufacturing an electrode slurry. As illustrated in FIG. 1, the method includes: step S1 of weighing a plurality of types of electrode materials to respective predetermined weights and placing the plurality of types of electrode materials into a feeder unit; step S3 of agitating the plurality of types of electrode materials in the feeder unit; step S5 of feeding the agitated plurality of types of electrode materials to a multi-screw kneader; and step S7 of kneading the plurality of types of electrode materials with the multi-screw kneader. The electrode slurry is manufactured using an electrode slurry manufacturing apparatus 10 (see FIG. 2).

The electrode slurry manufacturing apparatus and the manufacturing method of the electrode slurry disclosed herein are applicable to various types of apparatuses and methods for manufacturing electrode slurries used for electricity storage devices. Herein, the term "electricity storage device" is meant to encompass any type of device in which charge-discharge reactions are caused by migration of charge carriers between a pair of electrodes (positive electrode and negative electrode). The electricity storage devices according to the technology disclosed herein are intended to encompass secondary batteries, such as lithium-ion secondary batteries, nickel-metal hydride batteries, and nickel-cadmium batteries, as well as capacitors, such as lithium-ion capacitors and electric double-layer capacitors. In the following, a manufacturing apparatus and a manufacturing method for manufacturing an electrode slurry for lithium-ion secondary batteries will be described as examples of the technology disclosed herein.

Electrode Slurry Manufacturing Apparatus 10

Figure 2:
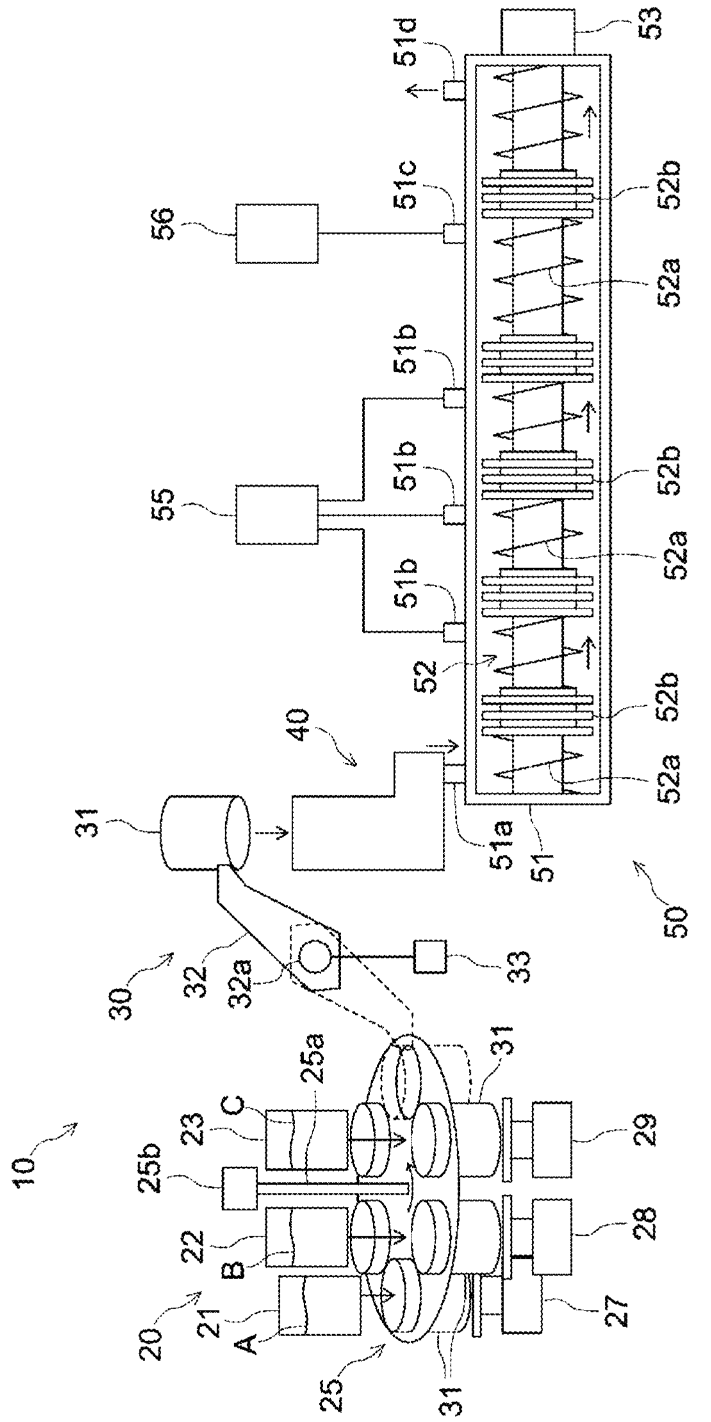
FIG. 2 is a schematic view of an electrode slurry manufacturing apparatus 10.

FIG. 2 is a schematic view of an electrode slurry manufacturing apparatus 10. In FIG. 2, the directions in which material is fed or sent are indicated by arrows. In the electrode slurry manufacturing apparatus 10, electrode materials and a solvent are kneaded, to manufacture an electrode mixture slurry. In this embodiment, the electrode slurry manufacturing apparatus 10 manufactures a positive electrode mixture slurry containing a positive electrode mixture. As illustrated in FIG. 2, the electrode slurry manufacturing apparatus 10 includes a material feeding unit 20, a material loading unit 30, a feeder unit 40, and a multi-screw kneader 50.

First, a plurality of types of electrode materials A to C are weighed to respective predetermined weights in the material feeding unit 20, and then put into the feeder unit 40 by the material loading unit 30 (S1).

Material Feeding Unit 20

The material feeding unit 20 includes feeder devices 21 to 23 and weighing devices 27 to 29. Powdery electrode materials A to C are fed respectively from the feeder devices 21 to 23. For the feeder devices 21 to 23, it is possible to use various known devices that are capable of feeding a constant amount of powdery material. For the feeder devices 21 to 23, it is possible to use circle feeders, screw feeders, rotary feeders, belt feeders, or the like.

The feeder devices 21 and 23 accommodate the electrode materials A and C, respectively. In this embodiment, each of the electrode materials A and C is a lithium-nickel-cobalt-manganese composite oxide as a positive electrode active material. Herein, the electrode material A is a lithium-nickel-cobalt-manganese composite oxide having an average particle size of 4 μm and a tap density of 2.2 $g/cm^3$. The electrode material C is a lithium-nickel-cobalt-manganese composite oxide having an average particle size of 17 μm and a tap density of 2.4 $g/cm^3$. The feeder device 22 accommodates the electrode material B. In this embodiment, the electrode material B is polyvinylidene difluoride (PVDF) as a binder. Herein, the electrode material B is PVDF having a density of 1 $g/cm^3$.

It should be noted that the positive electrode active materials and the binder are not limited to the just-mentioned examples, but may use various types of materials that are conventionally used as the positive electrode active materials and the binders for lithium-ion secondary batteries without any particular limitation. Examples of the positive electrode active materials may include: particles of an oxide containing lithium and one or more transition metal elements as its constituent metallic elements (i.e., lithium-transition metal oxide), such as lithium nickel oxide (e.g., $LiNiO_2$), lithium cobalt oxide (e.g., $LiCoO_2$), lithium manganese oxide (e.g., $LiMn_2O_4$), and composites thereof (e.g., $LiNi_{0.5}Mn_{1.5}O_4$ and $LiNi_{1/3}Co_{1/3}Mn_{1/3}O_2$); and particles of a phosphate containing lithium and one or more transition metal elements as its constituent metallic elements, such as lithium manganese phosphate ($LiMnPO_4$) and lithium iron phosphate ($LiFePO_4$). Examples of the binder that may be used include: acrylic resin, such as (meth)acrylate polymer; halogenated vinyl resin, such as polyvinylidene difluoride (PVDF); and polyalkylene oxide, such as polyethylene oxide (PEO). From the viewpoint of ease in agitating and kneading in the later processing steps, it is possible that the density (or tap density) of the powdery electrode materials that are fed from the feeder unit may be from 0.5 $g/cm^3$ to 3.0 $g/cm^3$.

The weighing units 27 to 29 are devices that weigh the electrode materials A to C that are fed from the feeder units 21 to 23. On the weighing units 27 to 29, containers 31, in which the electrode materials A to C respectively fed from the feeders 21 to 23 are to be contained, are placed. The containers 31 are arranged on an index table 25. It is possible that a plurality of (six in the embodiment shown in FIG. 2) containers 31 may be disposed in the index table 25. The index table 25 is rotatively driven in a predetermined direction with predetermined timing by a drive device **25*b* connected to a shaft 25*a*. As the index table 25 rotates, the containers 31 sequentially move their positions at which the electrode materials A to C are fed from the feeder devices 21 to 23, from one to another. At that time, the weighing devices 27 to 29 weigh the weights of the electrode materials A to C, respectively, that are fed to the containers 31. When one of the containers 31 moves one position at which the electrode materials A to C are to be fed to another, the other containers 31 also move in the same direction and at the same timing. When one of the containers 31 is fed with the materials, the following ones of the containers 31** are also fed with the materials sequentially.

In the weighing devices 27 to 29, the electrode materials A to C are weighed to respective predetermined weights. For the weighing devices 27 to 29, it is possible to use, for example, weighing scales, load cells, or the like. First, a container 31 moves to a position at which the electrode material A is to be fed. The container 31 is placed on the weighing device 27. The weighing device 27 weighs the weight of the electrode material A that is fed from the feeder device 21 to the container 31. Next, the container 31 moves to a position at which the electrode material B is to be fed. The container 31 is placed on the weighing device 28. The weighing device 28 weighs the weight of the electrode material B that is fed from the feeder device 22 to the container 31. Next, the container 31 moves to a position at which the electrode material C is to be fed. The container 31 is placed on the weighing device 29. The weighing device 29 weighs the weight of the electrode material C that is fed from the feeder device 23 to the container 31.

The weights of the electrode materials A to C that are weighed by the weighing devices 27 to 29 may be set as appropriate according to the target composition of the electrode mixture slurry to be obtained. The weight ratio of the positive electrode active material, the binder, and the conductive agent that are contained in the positive electrode mixture slurry may be, for example, as follows: positive electrode active material:binder:conductive agent=96.0-99.0:0.5-2.0:0.5-2.0, approximately. In this embodiment, the weight ratio of the positive electrode active material, the binder, and the conductive agent that are contained in the positive electrode mixture is set to be: positive electrode active material:binder:conductive agent=97.5:1.0:1.5. The weighing devices 27 to 29 weigh the electrode materials A to C in the containers 31 so that their weight ratio is: electrode material A (positive electrode active material): electrode material B (binder):electrode material C (positive electrode active material)=48.75:1.0:48.75. In this embodiment, acetylene black (AB) is used as the conductive agent. The acetylene black as the conductive agent is charged into a later-described multi-screw kneader 50 in the form of paste.

In this embodiment, the electrode materials A to C are placed in the container 31 in the following order: the electrode material A, the electrode material B, and the electrode material C. In the container 31, the electrode material A (positive electrode active material), the electrode material B (binder), and the electrode material C (positive electrode active material) are placed in that order from the bottom toward the opening of the container 31. In the step S1 of weighing the electrode materials and putting the electrode materials into the container 31, the positive electrode active material, which has a relatively higher density, is put into the container 31, then the binder, which has a relatively lower density, is put into the container 31, and further, the positive electrode active material, which has a relatively higher density, is put into the container 31.

It should be noted that the method of putting the electrode materials A to C into the material loading unit 30 is not limited to a particular method. For example, it is also possible that the electrode materials A to C may be weighed with another container and thereafter placed into the container 31. In addition, the order in which the electrode materials A to C are put into the container 31 is not limited to the above-described embodiment. For example, the electrode materials A to C may be placed in the container 31 in the following order: the electrode material C, the electrode material B, and the electrode material A. The order in which materials are put into the container 31 may be set as appropriate depending on the physical properties, number, or the like of the materials.

Material Loading Unit 30

The material loading unit 30 is configured to put a plurality of types of electrode materials A to C collectively into the feeder unit 40. This embodiment uses, as the material loading unit 30, a reversing loading unit that puts the electrode materials A to C into the feeder unit 40 by reversing the containers 31. Hereinafter, the material loading unit 30 may also be referred to as a reversing loading unit 30. The material loading unit 30 is not limited to the reversing loading unit 30, but may be any type of known material loading unit. For the material loading unit 30, it is also possible to use a circle feeder, a screw feeder, a rotary feeder, a belt feeder, or the like.

The reversing loading unit 30 includes an arm 32 and a drive device 33. The arm 32 is configured to be able to hold the container 31. The drive device 33 is a device that drives the arm 32 about a fulcrum 32*a* as the axis that is set in the arm 32. The drive device 33 may be implemented with, for example, a motor, sprockets, and the like.

In this embodiment, the drive device 33 causes the arm 32 to rotate toward the feeder unit 40 about the fulcrum 32*a* as the axis. The drive device 33 causes the arm 32 to stop at a point where the arm 32 is rotated approximately 180 degrees. This allows the opening of the container 31 to be reversed from the state where it faces upward (the state indicated by dashed lines in FIG. 2) to the state where it faces downward. The positions of the reversing loading unit 30 and the feeder unit 40 are set to be such positions at which the container 31 is reversed over an agitation chamber 41 (see FIG. 3) of the feeder unit 40. An upper part of the agitation chamber 41 is provided with an inlet opening 41*a* (see FIG. 3) through which materials are loaded. The electrode materials A to C are dropped from the container 31 that is reversed, to be put into the agitation chamber 41 through the inlet opening 41*a*. From the container 31, the electrode materials A to C are charged into the agitation chamber 41 in the following order: the electrode material C, the electrode material B, and the electrode material A. Note that when putting the electrode materials A to C into the feeder unit 40, it is possible to use a device other than the reversing loading unit 30. For example, it is possible to use a lifting or lowering type reversing loading unit with which the containers are reversed while being lifted or lowered along the lifting or lowering axis.

After the electrode materials A to C are put into the feeder unit 40, the arm 32 is driven in the opposite direction by the drive device 33. The container 31 is returned to the index table 25. Thereafter, the container 31 moves according to rotation of the index table 25. At this time, another container 31 containing the electrode materials A to C having been weighed is newly sent to the reversing loading unit 30. By repeating this process, containers 31 containing the electrode materials A to C are sent to the reversing loading unit 30 at regular intervals.

The electrode materials A to C are intermittently charged into the feeder unit 40 by the reversing loading unit 30. The weighing of the electrode materials A to C in the material feeding unit 20 and the reverse charging of the electrode materials A to C by the reversing loading unit 30 may be performed in conjunction with each other. In this embodiment, the charging of the electrode materials A to C into the container 31 in the reversing loading unit 30 and the reversing loading of the materials from the reversing loading unit 30 to the feeder unit 40 are repeated at a cycle of about 30 seconds. This enables substantially a constant amount of electrode materials A to C to be put into the feeder unit 40 at substantially regular intervals. In other words, step S1 of weighing the electrode materials A to C and putting the electrode materials A to C into the feeder unit 40 is performed repeatedly at regular intervals. The electrode materials A to C may be fed into the feeder unit 40 at predetermined intervals with their weight ratio being adjusted. Because the electrode materials A to C are weighed each time they are put into the feeder unit 40, the weight ratio of the electrode materials A to C is likely to be stable inside the feeder unit 40. Even when using a plurality of electrode materials A to C, the mixing ratio of the mixed powder materials that are put into the feeder unit 40 is guaranteed easily.

The electrode materials A to C that are put into the feeder unit 40 are agitated inside the feeder unit 40 (S3).

Feeder Unit 40

Figure 3:
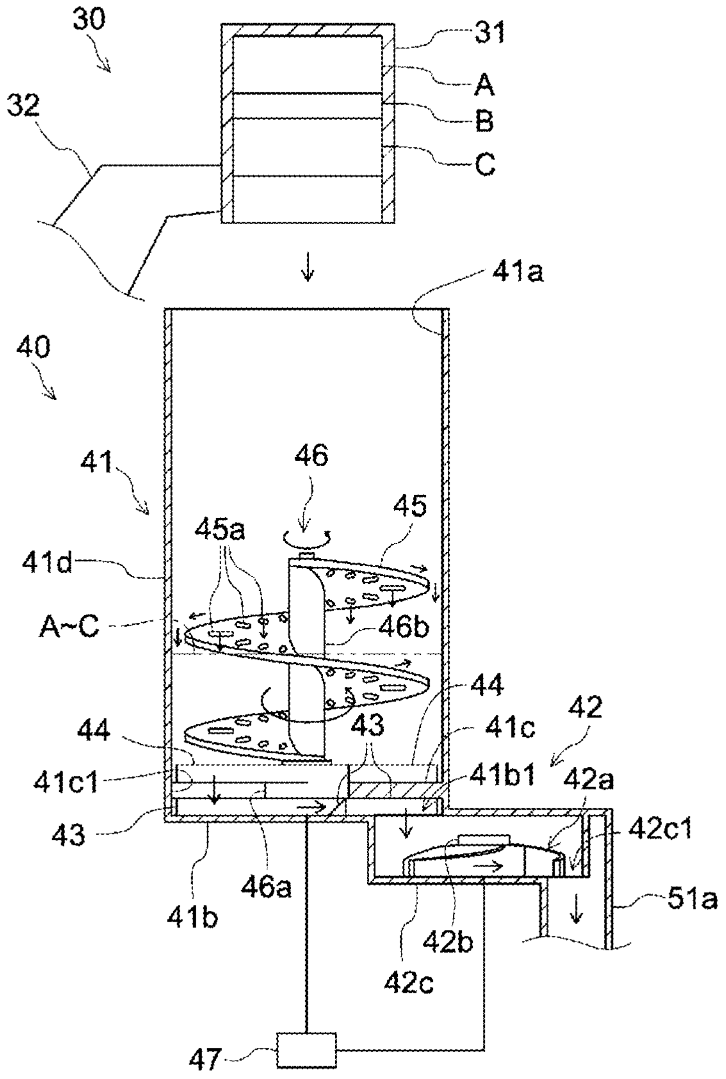
FIG. 3 is a schematic view of a feeder unit 40.

FIG. 3 is a schematic view of the feeder unit 40. In FIG. 3, the directions in which the electrode materials A to C are transferred and the direction in which a spiral shaped blade 45 is rotated are indicated by arrows. FIG. 3 schematically shows a cross section of the feeder unit 40 taking along a height direction. This embodiment uses, as the feeder unit 40, a quantitative feeder unit 40 that continuously feeds predetermined quantities of materials (which is hereinafter referred to as a feeder unit 40). In this embodiment, the feeder unit 40 is what is called a circle feeder. Using a circle feeder as the feeder unit 40 may serve to stabilize the feed amounts of the electrode materials A to C and may also reduce the size of the equipment.

As illustrated in FIG. 3, the feeder unit 40 includes an inlet opening 41*a*, an agitation chamber 41, a discharge opening 41*b*1, feeding blades 43 and 44, and a spiral shaped blade 45. The inlet opening 41*a* and the discharge opening 41*b*1 are provided for the agitation chamber 41. Into the inlet opening 41*a*, the electrode materials A to C are loaded from the material loading unit 30. In the agitation chamber 41, the electrode materials A to C are agitated. The electrode materials A to C that have been agitated in the agitation chamber 41 are fed through the discharge opening 41*b*1 to the multi-screw kneader 50.

Agitation Chamber 41

The agitation chamber 41 is formed in a substantially hollow cylindrical shape. The top part of the agitation chamber 41 is open, forming the inlet opening 41*a*, through which the electrode materials A to C are loaded. The agitation chamber 41 includes a substantially disk-shaped bottom part 41*b*. The discharge opening 41*b*1 is formed in a portion of the bottom part 41*b*. The agitation chamber 41 is connected to a quantitative feeding chamber 42 via the discharge opening 41*b*1. An intermediate plate 41*c* is provided above the discharge opening 41*b*1. The intermediate plate 41*c* is substantially in a disk shape except for an opening 41*c*1 formed in a portion thereof. The intermediate plate 41*c* is dimensioned to cover at least the region above the discharge opening 41*b*1. The opening 41*c*1 of the intermediate plate 41*c* and the discharge opening 41*b*1 of the bottom part 41*b* are formed at different positions when viewed in plan. The opening 41*c*1 of the intermediate plate 41*c* and the discharge opening 41*b*1 of the bottom part 41*b* are disposed opposite each other across a shaft 46 provided at substantially the center of the bottom part 41*b*.

Feeding Blades 43 and 44

The feeding blades 43 and 44 feed out the electrode materials A to C toward the discharge opening 41*b*1. The feeding blades 43 and 44 are mounted to the shaft 46. The feeding blades 43 and 44 turn according to rotation of the shaft 46. The shaft 46 includes a lower portion 46*a* and an upper portion 46*b*. Each of the lower portion 46*a* and the upper portion 46*b* of the shaft 46 is in a substantially columnar shape. The lower portion 46*a* is larger in diameter and shorter in length than the upper portion 46*b*. The shaft 46 is provided on the bottom part 41*b* and extends upward from the substantially central portion of bottom part 41*b*.

The feeding blades 43 and 44 are each a substantially rod-shaped member. The feeding blades 43 and 44 extend radially outward from the shaft 46. The feeding blades 43 are provided below the intermediate plate 41*c*. The feeding blades 44 are provided above the intermediate plate 41*c*. In other words, the feeding blades 43 and the feeding blades 44 are provided at positions such as to sandwich the intermediate plate 41*c*. The feeding blades 43 are provided along the upper surface of the bottom part 41*b*. Four feeding blades 43 each extend from a part of the lower portion 46*a* of the shaft 46 that is lower than the intermediate plate 41*c*. The four feeding blades 43 are provided at substantially equal space intervals along a circumferential direction of the shaft 46. The feeding blades 44 are provided along the upper surface of the intermediate plate 41*c*. Two feeding blades 44 extend in opposite directions to each other from a part of the lower portion 46*a* of the shaft 46 that is higher than the intermediate plate 41*c*. The shaft 46 is connected to a drive device 47. The drive device 47 is, for example, a motor. The drive device 47 may be connected to the shaft 46 via reduction gears, transmission gears, or the like. The drive device 47 rotatively drives the shaft 46 to thereby cause the feeding blades 43 and 44 to turn.

Spiral Shaped Blade 45

The spiral shaped blade 45 agitates the electrode materials A to C within the agitation chamber 41. The spiral shaped blade 45 is mounted to the upper portion 46*b* of the shaft 46. The spiral shaped blade 45 turns according to rotation of the shaft 46. The spiral shaped blade 45 is disposed above the feeding blades 43 mounted to the lower portion 46*a* of the shaft 46. As the drive device 47 rotates the shaft 46, the feeding blades 43 and 44 and the spiral shaped blade 45 are turned along the circumferential direction of the shaft 46 in the same direction and at the same number of rotations. It should be noted that the "spiral shaped blade 45" is a member that is coiled in a predetermined direction around the circumferential direction and along the height direction of the shaft 46.

In this embodiment, the spiral shaped blade 45 is in a plate-like shape and is coiled around the shaft 46. In other words, the spiral shaped blade 45 is connected to the outer circumferential surface of the shaft 46 in radial directions of the shaft 46. The spiral shaped blade 45 is what is called a screw blade. The spiral shaped blade 45 is coiled 2 laps clockwise around the shaft 46 from the base end toward the tip end. The outer edge of the spiral shaped blade 45 is radially spaced at a substantially constant gap from the inner circumferential surface of the agitation chamber 41. The just-mentioned gap is set to have dimensions such that the electrode materials A to C can pass therethrough.

A plurality of holes 45*a* are formed in the spiral shaped blade 45. The plurality of holes 45*a* are set to have dimensions such that the electrode materials A to C can pass therethrough. Although not particularly limited thereto, the dimensions of the holes 45*a* may be set to such dimensions that the inner diameter thereof or the gap thereof at the narrowest portion may be greater than or equal to 1 mm, and may preferably be greater than or equal to 3 mm, for example. Although not particularly limited thereto, the dimensions of the holes 45*a* may be set to such dimensions that the inner diameter thereof or the gap thereof at the narrowest portion may be less than or equal to 20 mm, or may preferably be less than or equal to 10 mm, for example.

The holes 45*a* are elongated holes extending along radial directions of the shaft 46. The shape of the holes 45*a* is not limited to any particular shape. In this embodiment, the outer shape of the holes 45*a* is substantially an oval shape including a pair of parallel straight lines and arc-shaped curves connecting the pair of parallel straight lines. Note that the shape of the holes 45*a* is not limited to such an oval shape, but may be a polygonal shape, such as a rectangular shape, or may be an elliptical shape. Although not particularly limited thereto, the ratio of the major axis length to the minor axis length (i.e., aspect ratio) of the holes 45*a* may be greater than 1, preferably greater than or equal to 2. The ratio of the major axis length to the minor axis length of the holes 45*a* may be less than or equal to 10, preferably less than or equal to 7. Note that the holes 45*a* may not necessarily be elongated holes, but may be in a circular shape or in a regular polygonal shape such as a regular square shape.

The plurality of holes 45*a* are formed intermittently along a direction in which the spiral shaped blade 45 is coiled. The plurality of holes 45*a* have substantially the same size and shape and are formed at substantially regular space intervals. The plurality of holes 45*a* are disposed radially close to the outer edge of the spiral shaped blade 45. The holes 45*a* are provided more outward than the middle part with respect to the widthwise direction of the spiral shaped blade 45 (radial directions of the shaft 46). The centers of the holes 45*a* are located more outward than the middle part with respect to the widthwise direction of the spiral shaped blade 45.

Inside the above-described feeder unit 40, the electrode materials A to C are agitated. Hereinafter, feeding of the electrode materials A to C into the feeder unit 40 and agitating of the electrode materials A to C inside the feeder unit 40 will be described.

By reversing the container 31 above the agitation chamber 41, the electrode materials A to C that are charged from the inlet opening 41*a* are fed into the feeder unit 40 in the reverse order in which they were put into the container 31 (i.e., in the order: the electrode material C, the electrode material B, and the electrode material A in this embodiment).

Inside the agitation chamber 41 of the feeder unit 40, the feeding blades 43 and 44 and the spiral shaped blade 45 are turned according to the rotation of the shaft 46 caused by the drive device 47. Herein, the feeding blades 43 and 44 and the spiral shaped blade 45 are turned in the counterclockwise direction (in the opposite direction to the direction in which the spiral shaped blade 45 is coiled from the bottom end to the tip end). When the electrode materials A to C are loaded into the agitation chamber 41, the loaded electrode materials A to C accumulate in the agitation chamber 41 while hitting the spiral shaped blade 45 that is turning.

A portion of the electrode materials A to C accumulates to a position at or lower than the upper end of the feeding blades 44. The electrode materials A to C that have accumulated to a position at or lower than the upper end of the feeding blades 44 is conveyed toward the opening 41*c*1 by the feeding blades 44. The conveyed electrode materials A to C fall through the opening 41*c*1 and accumulate in the bottom part 41*b*. The electrode materials A to C that have accumulated in the bottom part 41*b* are conveyed toward the discharge opening 41*b*1 by the feeding blades 43. The conveyed electrode materials A to C are discharged from the discharge opening 41*b*1.

A portion of the electrode materials A to C accumulates higher than the feeding blades 44. The electrode materials A to C that have accumulated higher than the feeding blades 44 are agitated along the direction of rotation of the spiral shaped blade 45 that is turning. In addition, a portion of the electrode materials A to C is lifted upward by the turning spiral shaped blade 45. The lifted electrode materials A to C fall through the holes 45*a* formed in the spiral shaped blade 45, or fall from the outer edge of the spiral shaped blade 45. This may allow the electrode materials A to C to be agitated also in vertical directions.

The electrode materials A to C that have fallen downward may be lifted and agitated again by the spiral shaped blade 45 when they accumulate higher than the feeding blades 44. The electrode materials A to C that have fallen downward is conveyed toward the opening 41*c*1 by the feeding blades 44 when they accumulate to a position at or lower than the upper end of the feeding blades 44. Next, the electrode materials A to C are conveyed toward the discharge opening 41*b*1 by the feeding blades 43. Thus, the electrode materials A to C are discharged from the discharge opening 41*b*1 in substantially constant amounts by the feeding blades 43 and 44 while being agitated by the spiral shaped blade 45.

The electrode materials A to C are fed intermittently by the material loading unit 30. The electrode materials A to C that are loaded from the material loading unit 30 may accumulate on top of the electrode materials A to C that have already accumulated in the agitation chamber 41. Therefore, the newly fed electrode materials A to C are agitated by the spiral shaped blade 45 and discharged from the discharge opening 41*b*1 sequentially. In this embodiment, the height of the spiral shaped blade 45 reaches a position higher than the height of the electrode materials A to C that can accumulate inside the agitation chamber 41. This may serve to obtain good agitation efficiency for the electrode materials A to C. As described above, in the agitation chamber 41, the electrode materials A to C are loaded by the material loading unit 30, agitated by the spiral shaped blade 45, and discharged from the discharge opening 41*b*1, one after another.

In this embodiment, the quantitative feeding chamber 42 is connected to the discharge opening 41*b*1 of the agitation chamber 41. The quantitative feeding chamber 42 is in a substantially hollow cylindrical shape lower than the agitation chamber 41. The quantitative feeding chamber 42 is provided with feeding blades 42*a*. The feeding blades 42*a* are mounted to the shaft 42*b*. The shaft 42*b* extends upward from the substantially central portion of a bottom part 42*c*. The feeding blades 42*a* curvedly extend radially outward from the shaft 42*b* along bottom part 42*a*. The feeding blades 42*a* with such a shape easily stabilize the amounts of the electrode materials A to C to be fed. The height of the feeding blades 42*a* is lowered toward the radially outward ends. In this embodiment, four feeding blades 42*a* extend from the shaft 42*b*. It should be noted that the shape, number, and the like of the feeding blades 42*a* are not limited in any particular way but may be set as appropriate according to, for example, the types of materials. The shaft 42*b* is connected to the drive device 47. Therefore, the feeding blades 42*a* rotate with the same timing as the feeding blades 43 and 44 and the spiral shaped blade 45 rotate. A discharge opening 42*cl* is formed in the bottom part 42*c* of the quantitative feeding chamber 42. Note that the quantitative feeding chamber 42 may not necessarily be provided.

The amount of the electrode materials A to C to be discharged from the discharge opening 42*c*1 is set according to the number of rotations of the feeding blades 42*a*, 43, and 44. Because the feeding blades 42*a*, 43, and 44 are rotatively driven at a constant speed by the drive device 47, a substantially constant amount of the electrode materials A to C may be discharged continuously from the discharge port 42*c*1. The number of rotations of the feeding blades 42*a*, 43, and 44 is not limited to a particular number, but may be set as appropriate according to the intervals at which the electrode materials A to C that are reversingly loaded, the amount thereof, or the like.

The agitated electrode materials A to C are discharged from the discharge opening 41*b*1 of the feeder unit 40 and fed to the multi-screw kneader 50 (S5).

Multi-Screw Kneader 50

The multi-screw kneader 50 (see FIG. 2) is an apparatus for kneading the electrode materials A to C while applying a shearing force thereto. The electrode materials A to C are kneaded while they are being conveyed along the conveying direction within the multi-screw kneader 50 As illustrated in FIG. 2, the multi-screw kneader 50 includes a barrel 51, shafts 52 provided inside the barrel 51, and a drive device 53 for driving the shafts 52. This embodiment uses, as the multi-screw kneader 50, a twin-screw kneader 50 including two shafts 52 extending substantially parallel to each other in the barrel 51. The twin-screw kneader 50 may also be provided with a thermometer for measuring the temperature of the material inside the barrel 51, a chiller for adjusting the temperature of the material inside the barrel 51, and the like. It should be noted that the device for kneading electrode materials is not limited to the twin-screw kneader, but may be a multi-screw kneader, such as a four-screw kneader.

The barrel 51 is in a cylindrical shape and has space for containing electrode materials, solvent, or the like. At one end of the barrel 51, a powder feed port 51*a* is formed, through which the electrode materials A to C are fed. The powder feed port 51*a* is connected to the discharge opening 41*b*1 of the feeder unit 40. In this embodiment, the powder feed port 51*a* is connected to the discharge opening 41*b*1 via the discharge opening 42*cl* of the quantitative feeding chamber 42. A plurality of solvent feed ports 51*b* are provided downstream of the powder feed port 51*a*. A solvent feeding device 55 is connected to the solvent feed ports 51*b*. A mohno pump may be connected to the solvent feeding device 55 to keep the discharge amount constant. A constant discharge amount of solvent is continuously fed through the solvent feed ports 51*b*. Examples of the solvent may include water and N-methyl-2-pyrrolidone (NMP). A paste inlet port 51*c* is provided downstream of the plurality of solvent feed ports 51*b*. A paste feeding device 56 is connected to the paste inlet port 51*c*. Like the solvent feeding device 55, a mohno pump may be connected to the paste feeding device 56, to keep the discharge amount constant. The mohno pump may be provided with a flowmeter for measuring the flow rates of the solvent and paste that are to be fed. In order to stabilize the discharge amount, the rotation of the rotor of the mohno pump may be controlled according to the flow rate obtained by the flowmeter. A constant discharge amount of paste is continuously fed from the paste inlet port 51*c*. In this embodiment, a conductive agent (acetylene black in this embodiment) in a paste form is put through the paste inlet port 51*c*. In this way, materials for the positive electrode mixture slurry are fed into the barrel 51 in the order: the electrode materials A to C, the solvent, and the conductive agent. A discharge port 51*d* is provided downstream of the paste inlet port 51*c*. The discharge port 51*d* is provided at an end portion of the barrel 51 that is opposite to the powder feed port 51*a*. A finished positive electrode mixture slurry is discharged from the discharge port 51*d*.

The shaft 52, which extends along the conveying direction, is provided inside the barrel 51. The shaft 52 is provided with screws 52*a* and paddles 52*b*. A plurality of screws 52*a* and a plurality of paddles 52*b* are provided along the conveying direction. The screws 52*a* and the paddles 52*b* are provided on the outer circumferential surface of the shaft 52. Each of the screws 52*a* includes a blade that is coiled in a spiral shape. Each of the paddles 52*b* is a plate-shaped member including a wider surface facing in the conveying direction. Each of the paddles 52*b* may be, but is not particularly limited to, a polygonal shape (such as a triangular shape, a quadrangular shape, or a hexagonal shape) in which the corner portions are formed in a curved shape. The side circumferential surface of each paddle 52*b* may also be formed in a curved shape. A predetermined clearance gap is provided between the side circumferential surfaces of the paddles 52*b* and the inner circumferential surface of the barrel 51.

The drive device 53 may be, for example, a motor that rotatively drives the shaft 52. As the shaft 52 rotates, the screws 52*a* and the paddles 52*b* rotate along the circumferential direction of the shaft 52. The materials in the barrel 51 are pushed by the blades of the screws 52*a* and conveyed along the conveying direction. A shearing force is applied to the materials in the barrel 51 between the side circumferential surfaces of the paddles 52*b* and the inner circumferential surface of the barrel 51. The twin-screw kneader 50 may also be provided with a pressure gauge for measuring the pressure inside the barrel 51. The driving by the drive device 53 may be controlled so that the pressure inside the barrel 51 that is measured by the pressure gauge falls within a predetermined pressure range.

The electrode materials A to C are kneaded with the use of the above-described twin-screw kneader 50 (S7).

The electrode materials A to C that have been agitated in the feeder unit 40 are fed through the powder feed port 51*a* into the barrel 51 of the twin-screw kneader 50. The inside of the barrel 51 is continuously fed with a substantially constant amount of the electrode materials A to C per unit time by the feeder unit 40.

The electrode materials A to C are conveyed in the conveying direction by the screws 52*a*. The electrode materials A to C are conveyed while a shearing force is being applied thereto as they pass through the gap between the side circumferential surfaces of the paddles 52*b* and the inner circumferential surface of the barrel 51. The electrode materials A to C conveyed in the barrel 51 are mixed with a solvent fed through the solvent feed ports 51*b*. The solvent is placed into the barrel 51 separately through the plurality of solvent feed ports 51*b* provided along the conveying direction. This allows the electrode materials A to C and the solvent to be mixed with each other in a step-by-step manner. As a result, it is unlikely to cause unevenness in the materials that are kneaded. The materials conveyed in the barrel 51 (the electrode materials A to C and the solvent herein) are mixed with a conductive agent in a paste form. The conductive agent in a paste form is placed through the paste inlet port 51*c* into the barrel 51. The electrode materials A to C, the solvent, and the conductive agent are conveyed while being kneaded, to thus complete a positive electrode mixture slurry. The manufactured positive electrode mixture slurry is discharged from the discharge port 51*d*.

With the use of the manufactured positive electrode mixture slurry, a battery may be manufactured according to a known method. For example, the positive electrode mixture slurry is applied to both sides of a positive electrode current collector and is then dried. The resultant material is cut into a predetermined size and pressure-rolled with a roll press, to prepare a positive electrode sheet in which positive electrode active material layers are provided on both sides of the positive electrode current collector. A negative electrode mixture slurry is also manufactured, and a negative electrode sheet provided with a negative electrode active material is prepared in a similar procedure to the procedure by which the positive electrode sheet was prepared. The positive electrode sheet and the negative electrode sheet are stacked with a separator sheet interposed therebetween, to prepare an electrode assembly. The electrode assembly is accommodated in a battery case, to prepare a battery assembly. An electrolyte solution is filled into the battery assembly, and initial charging and an aging process are performed, to thus manufacture a battery.

The electrode slurry (electrode mixture slurry), which is used for the electrodes, contains a plurality of electrode materials. The plurality of electrode materials are put under a high shearing force and kneaded in a multi-screw kneader. Next, the kneaded electrode materials are diluted and dispersed in a solvent or the like. However, the plurality of electrode materials may have different physical properties, such as specific gravity, particle size, and viscosity, for example. Moreover, the electrode materials may contain materials that are difficult to uniformly disperse in a solvent or the like. Examples of the materials that are difficult to disperse uniformly include binders and thickening agents. When the materials become non-uniform in the multi-screw kneader, such as when the electrode materials having different physical properties are contained or when the electrode materials that show unfavorable dispersion capability are contained, there is a concern that the finished electrode slurry also causes the materials to be non-uniform. In this case, the problem of non-uniformity may arise also when the electrode slurry is applied as an electrode mixture, causing unstable product quality in the resulting electrodes.

In the above-described embodiment, the electrode slurry manufacturing apparatus 10 includes the material loading unit 30, the feeder unit 40, and the multi-screw kneader 50. The material loading unit 30 is configured to put a plurality of types of electrode materials A to C collectively into the feeder unit 40. The feeder unit 40 includes the inlet opening 41*a*, the agitation chamber 41, the discharge opening 41*b*1, the feeding blades 43 and 44, and the spiral shaped blade 45. Into the inlet opening 41*a*, the electrode materials A to C are loaded from the material loading unit 30. In the agitation chamber 41, the electrode materials A to C are agitated. The discharge opening 41*b*1 is disposed in the bottom part 41*b* of the agitation chamber 41. From the discharge opening 41*b*1, the electrode materials A to C are fed out to the multi-screw kneader 50. The feeding blades 43 and 44 are mounted to the shaft 46 disposed on the bottom part 41*b* of the agitation chamber 41. The feeding blades 43 and 44 feed out the electrode materials A to C to the discharge opening 41*b*1. The spiral shaped blade 45 is disposed above the feeding blades 43 and 44 and is mounted to the shaft 46.

With such an electrode slurry manufacturing apparatus 10, the electrode materials A to C that are put into the agitation chamber 41 are agitated by the spiral shaped blade 45 and discharged from the discharge opening 41*b*1 by the feeding blades 43 and 44, to be fed to the multi-screw kneader 50. During the agitation, the electrode materials A to C are agitated along the direction of rotation of the turning spiral shaped blade 45. In addition, the electrode materials A to C may be lifted upward by the spiral shaped blade 45 or dropped from the spiral shaped blade 45. This may allow the electrode materials A to C to be agitated also in vertical directions. Thus, the electrode materials A to C may be agitated in the agitation chamber 41 along two directions, the direction of rotation of the spiral shaped blade 45 and the vertical direction. This allows the electrode materials A to improve material uniformity in the agitation chamber 41. Because the electrode materials A to C with favorable material uniformity are fed into the multi-screw kneader 50, a shearing force is easily applied uniformly to the electrode materials A to C in the multi-screw kneader 50. The electrode materials A to C may disperse favorably inside the multi-screw kneader 50. As a result, the electrode materials A to C may disperse within the electrode slurry favorably, resulting in stable product quality of the electrodes.

In the above-described embodiment, the spiral shaped blade 45 is connected to the shaft 46 in radial directions of the shaft 46. The lifted electrode materials A to C tend to fall the outer edge of the spiral shaped blade 45 easily. This allows the electrode materials A to C to easily circulate along the path in which they are lifted upward and then dropped outward from the outer edge of the spiral shaped blade 45. As a result, the electrode materials A to C are more easily agitated in vertical directions.

In the above-described embodiment, the spiral shaped blade 45 includes the plurality of holes 45*a* through which the electrode materials A to C pass. The lifted electrode materials A to C also fall through the holes 45*a*, not just from the circumferential periphery of the spiral shaped blade 45. Providing additional locations from which the lifted electrode materials A to C can fall allows the electrode materials A to C to be more easily agitated.

In the above-described embodiment, the plurality of holes 45*a* are formed intermittently along the direction in which the spiral shaped blade 45 is coiled. The plurality of holes 45*a* are provided intermittently at different heights. This may allow the electrode materials A to C to fall from the holes 45*a* at various heights. As a result, the electrode materials A to C are more easily agitated.

In the above-described embodiment, the holes 45*a* are elongated holes extending along radial directions of the shaft 46. Because the holes 45*a* extend along radial directions of the shaft 46, the electrode materials A to C that are lifted by the spiral shaped blade 45 are allowed to fall through the holes 45*a* easily. This allows the electrode materials A to C to be agitated more easily.

In the above-described embodiment, the plurality of electrode materials A to C include a first electrode material (PVDF as the electrode material B in this embodiment), and a second electrode material having a higher density than the first electrode material (the positive electrode active material as the electrode materials A and C in this embodiment). The step of weighing and putting the electrode materials into the container 31 includes, after placing a portion of the second electrode material (i.e., the electrode material A) into the container 31, placing the first electrode material (i.e., the electrode material B) into the container 31, and further placing a remainder of the second electrode material (the electrode material C) into the container 31. In the container 31, the electrode material B, which has a relatively lower density, is sandwiched by the electrode materials A and C, which have a relatively higher density. This may reduce flying about of the electrode material B when charging the electrode materials A to C into the container 31 and when loading the electrode materials A to C from the container 31 into the feeder unit 40. As a result, the weight ratio of the electrode materials A to C that are fed to the twin-screw kneader 50 is allowed to be stable.

Although a method of manufacturing a positive electrode mixture slurry has been described herein as one example, the method according to the disclosure is not limited to such an embodiment. The electrode slurry manufacturing apparatus 10 may also manufacture a negative electrode mixture slurry.

The negative electrode mixture slurry may contain, for example, a negative electrode active material, a thickening agent, and a binder. The materials that may be contained in the negative electrode mixture slurry are not limited to any particular material, but may include various types of materials that are conventionally used as the materials for lithium-ion secondary batteries without any particular limitation. Examples of the negative electrode active material may include: carbon materials represented by artificial graphite, natural graphite, amorphous carbon, and composites thereof (e.g., amorphous carbon coated graphite); materials that form an alloy with lithium, such as silicon (Si); and lithium storage compounds such as a silicon compound (such as SiO). The thickening agent may be, for example, carboxymethylcellulose (CMC). The binder may be, for example, styrene-butadiene rubber (SBR) or the like. The weight ratio of the negative electrode active material, the thickening agent, and the binder that may be contained in the negative electrode mixture slurry may be, for example, as follows: negative electrode active material:thickening agent: binder=96.0-99.0:0.5-2.0:0.5-2.0, approximately.

When manufacturing a negative electrode mixture slurry, the negative electrode active material and CMC as a thickening agent may be placed into the container 31. SBR as the binder may be charged from the paste inlet port 51*c*, as with acetylene black in a paste form in the case of manufacturing the positive electrode mixture slurry. The steps of manufacturing the negative electrode mixture slurry are similar to the steps of manufacturing the positive electrode mixture slurry, and therefore, the detailed description thereof will not be given further.

The configuration of the feeder unit 40 is not limited to the embodiments described above. FIGS. 4 to 7 are schematic views of feeder units 40A to 40D according to other embodiments. Note that each of spiral shaped blades 45A to 45D of the feeder units 40A to 40D, respectively shown in FIGS. 4 to 7, may include holes 45*a* (see FIG. 3).

Figure 4:
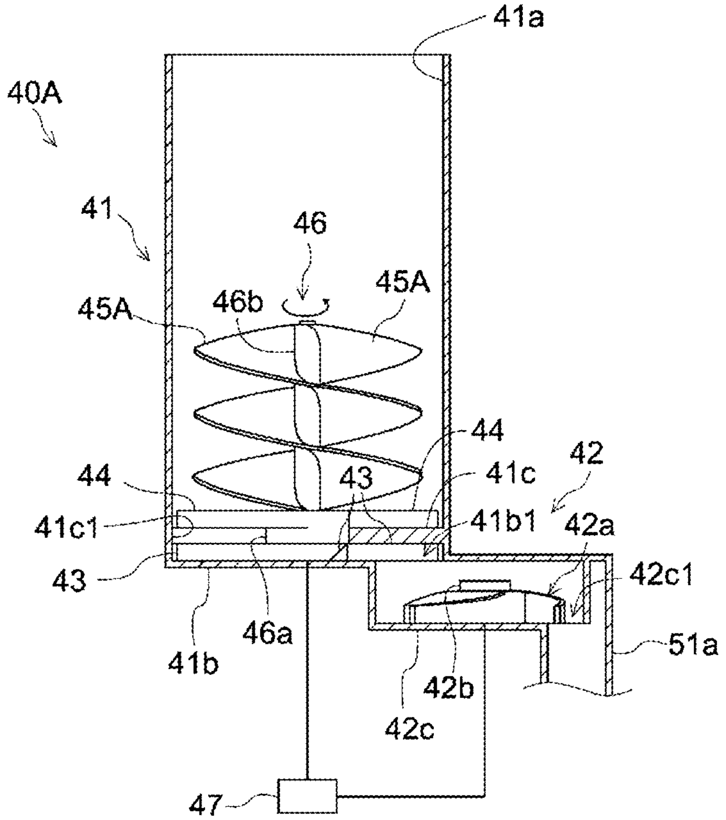
FIG. 4 is a schematic view of a feeder unit 40A according to another embodiment.
Figure 5:
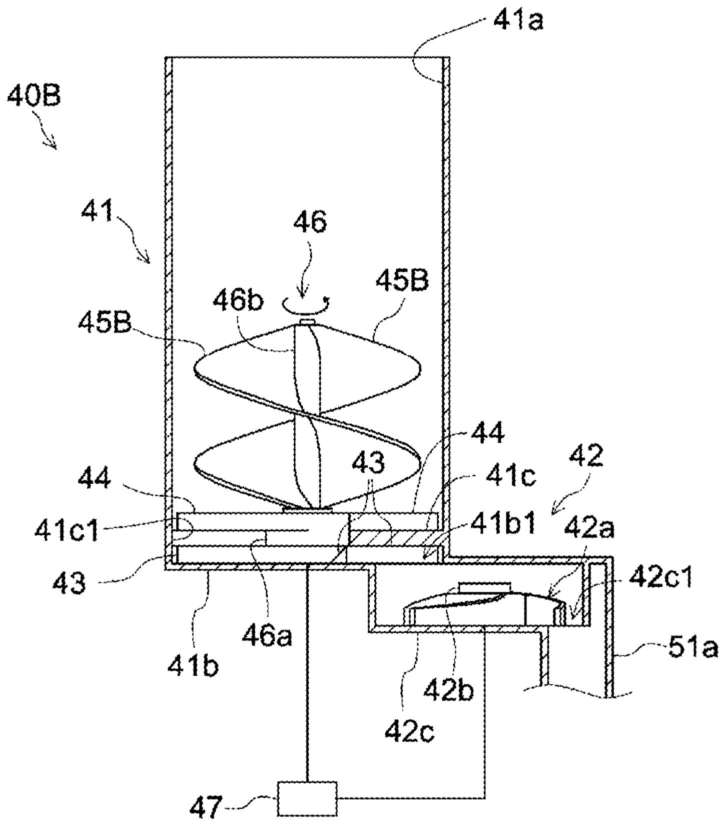
FIG. 5 is a schematic view of a feeder unit 40B according to yet another embodiment.

In the feeder unit 40A shown in FIG. 4, two spiral shaped blades 45A are coiled around the shaft 46. The two spiral shaped blades 45A are axisymmetric with respect to the shaft 46. The two spiral shaped blades 45A are each coiled about 1.5 laps around the shaft 46. In the feeder unit 40B shown in FIG. 5, the two spiral shaped blades 45A are each coiled about 1 lap around the shaft 46. The feeder unit 40B has the same configuration as the feeder unit 40A except that the number of coiling of the two spiral shaped blades 45B is about 1 lap. Thus, the number of coiling of and the number of blades per unit length of the spiral shaped blade coiled around the shaft 46 are not particularly limited, but may be set as appropriate according to the compositions of the electrode materials A to C or the like.

Figure 6:
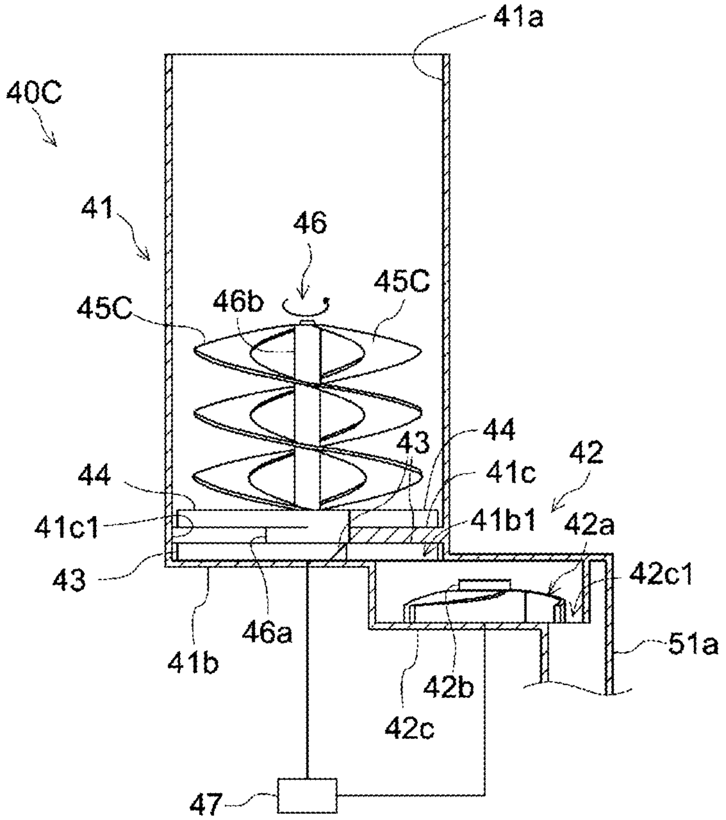
FIG. 6 is a schematic view of a feeder unit 40C according to still another embodiment.
Figure 7:
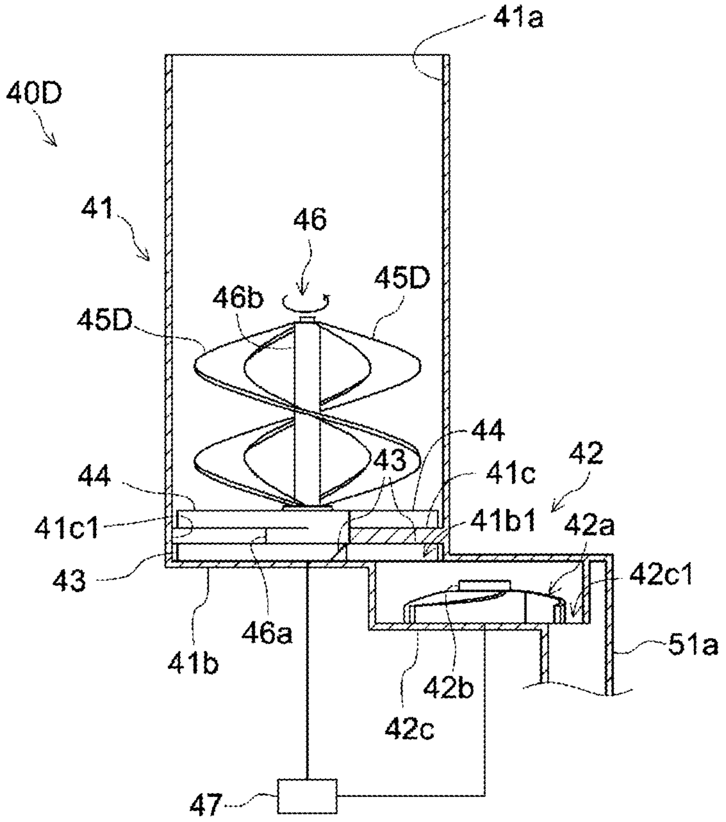
FIG. 7 is a schematic view of a feeder unit 40D according to further another embodiment.

In the feeder unit 40C shown in FIG. 6, two spiral shaped blades 45C are coiled around the shaft 46. The spiral shaped blades 45C each have a belt-like shape that is coiled around and spaced from the shaft 46, with a constant gap therefrom except for its base end and upper end. The spiral shaped blades 45C each include an upper surface on which the electrode materials A to C may be placed. The spiral shaped blades 45C are connected to rod-shaped members extending from the shaft 46 at the base end and the upper end of the shaft 46. This enables the shaft 46 and the spiral shaped blades 45C to be supported with a gap therebetween. The two spiral shaped blades 45C are axisymmetric with respect to the shaft 46. The two spiral shaped blades 45C are each coiled about 1.5 laps around the shaft 46. The electrode materials A to C may also fall from the gap (i.e., from the inner edges of the spiral shaped bladed 45C), not just from the outer edges of the spiral shaped blades 45C. In the feeder unit 40D shown in FIG. 7, the two spiral shaped blades 45A are each coiled about 1 lap around the shaft 46. The feeder unit 40D has the same configuration as the feeder unit 40C except that the number of coiling of the two spiral shaped blades 45D is about 1 lap. As described above, it is also possible that a gap may be provided between the shaft 46 and the circumferential peripheries of the spiral shaped blades.

According to the trials performed by the present inventors, it was discovered that the fewer the number of spiral shaped blades, the easier it is to agitate electrode materials with smaller particle sizes, while the greater the number of spiral shaped blades, the easier it is to agitate electrode materials with larger particle sizes. It was also discovered that the fewer the number of coiling of spiral shaped blades, the easier it is to agitate electrode materials with smaller particle sizes, while the greater the number of coiling of spiral shaped blades, the easier it is to agitate electrode materials with larger particle sizes. It was also discovered that, for the electrode materials with smaller particle sizes, it is easier to agitate the electrode materials when a gap is provided between the shaft and the spiral shaped blades. In the case of manufacturing the positive electrode mixture slurry as described in the above-described embodiment, the use of the feeder unit 40A, among the feeder units 40A to 40D, allows the electrode materials A to C to be most easily dispersed.

Various embodiments of the technology according to the present disclosure have been described hereinabove. Unless specifically stated otherwise, the embodiments described herein do not limit the scope of the present disclosure. It should be noted that various other modifications and alterations may be possible in the embodiments of the technology disclosed herein. In addition, the features, structures, or steps described herein may be omitted as appropriate, or may be combined in any suitable combinations, unless specifically stated otherwise. In addition, the present description includes the disclosure as set forth in the following items.

Item 1:

An electrode slurry manufacturing apparatus including:

a material loading unit;

a feeder unit; and a multi-screw kneader, wherein:

the material loading unit is configured to load a plurality of types of electrode materials collectively into the feeder unit; and the feeder unit includes:

an inlet opening into which the electrode materials are loaded from the material loading unit;

an agitation chamber in which the electrode materials are agitated;

a discharge opening, disposed in a bottom part of the agitation chamber, from which the electrode materials are fed out to the multi-screw kneader;

a feeding blade, mounted to a shaft disposed on the bottom part of the agitation chamber, and feeding the electrode materials to the discharge opening; and a spiral shaped blade disposed above the feeding blade and mounted to the shaft.

Item 2:

The electrode slurry manufacturing apparatus according to item 1, wherein the spiral shaped blade is connected to the shaft in a radial direction of the shaft.

Item 3:

The electrode slurry manufacturing apparatus according to item 1 or 2, wherein the spiral shaped blade includes a plurality of holes through which the electrode materials pass.

Item 4:

The electrode slurry manufacturing apparatus according to item 3, wherein the plurality of holes are formed intermittently along a direction in which the spiral shaped blade is coiled.

Item 5:

The electrode slurry manufacturing apparatus according to item 3 or 4, wherein each of the holes is an elongated hole extending along a radial direction of the shaft.

Item 6:

A method of manufacturing an electrode slurry, including the steps of:

weighing a plurality of types of electrode materials to respective predetermined weights and putting the electrode materials into a feeder unit;

agitating the plurality of types of electrode materials in the feeder unit;

feeding the agitated plurality of types of electrode materials to a multi-screw kneader; and kneading the plurality of types of electrode materials with the multi-screw kneader, wherein:

the feeder unit includes:

an inlet opening into which the electrode materials are loaded from a material loading unit;

an agitation chamber in which the electrode materials are agitated;

a discharge opening, disposed in a bottom part of the agitation chamber, from which the electrode materials are fed out to the multi-screw kneader;

a feeding blade, mounted to a shaft disposed on the bottom part of the agitation chamber, and feeding the electrode materials to the discharge opening; and a spiral shaped blade disposed above the feeding blade and mounted to the shaft.

What is claimed is:

1. An electrode slurry manufacturing apparatus comprising:

a material loading unit;

a feeder unit; and a multi-screw kneader, wherein:

the material loading unit is configured to load a plurality of types of electrode materials collectively into the feeder unit; and the feeder unit includes:

an inlet opening into which the electrode materials are loaded from the material loading unit;

an agitation chamber in which the electrode materials are agitated;

a discharge opening, disposed in a bottom part of the agitation chamber, from which the electrode materials are fed out to the multi-screw kneader;

a feeding blade, mounted to a shaft disposed on the bottom part of the agitation chamber, and feeding the electrode materials to the discharge opening; and a spiral shaped blade disposed above the feeding blade and mounted to the shaft, wherein the spiral shaped blade includes a plurality of holes through which the electrode materials pass.

2. The electrode slurry manufacturing apparatus according to claim 1, wherein the spiral shaped blade is connected to the shaft in a radial direction of the shaft.

3. The electrode slurry manufacturing apparatus according to claim 1, wherein the plurality of holes are formed intermittently along a direction in which the spiral shaped blade is coiled.

4. The electrode slurry manufacturing apparatus according to claim 1, wherein each of the holes is an elongated hole extending along a radial direction of the shaft.

5. A method of manufacturing an electrode slurry, comprising the steps of:

weighing a plurality of types of electrode materials to respective predetermined weights and putting the electrode materials into a feeder unit;

agitating the plurality of types of electrode materials in the feeder unit;

feeding the agitated plurality of types of electrode materials to a multi-screw kneader; and kneading the plurality of types of electrode materials with the multi-screw kneader, wherein:

the feeder unit includes:

an inlet opening into which the electrode materials are loaded from a material loading unit;

an agitation chamber in which the electrode materials are agitated;

a discharge opening, disposed in a bottom part of the agitation chamber, from which the electrode materials are fed out to the multi-screw kneader;

a feeding blade, mounted to a shaft disposed on the bottom part of the agitation chamber, and feeding the electrode materials to the discharge opening; and a spiral shaped blade disposed above the feeding blade and mounted to the shaft.

* * * * *